(12) United States Patent
Darmon et al.

(10) Patent No.: US 6,456,146 B1
(45) Date of Patent: Sep. 24, 2002

(54) SYSTEM AND METHOD FOR MULTIPLEXING CLOCKING SIGNALS

(75) Inventors: Nathanel Darmon, Jerusalem; Aviad J. Wertheimer, Zur Hadassa, both of (IL)

(73) Assignee: Intel Corp., Santa Clara, CA (US)

( * ) Notice: Subject to any disclaimer, the term of this patent is extended or adjusted under 35 U.S.C. 154(b) by 0 days.

(21) Appl. No.: 09/751,984

(22) Filed: Dec. 28, 2000

(51) Int. Cl.$^7$ ................................................ H03K 17/62
(52) U.S. Cl. ........................................ 327/407; 327/298
(58) Field of Search .......................... 327/298, 99, 407, 327/292; 377/78, 80

(56) References Cited

U.S. PATENT DOCUMENTS

| | | | | |
|---|---|---|---|---|
| 5,357,146 A | * | 10/1994 | Heimann | 327/292 |
| 5,389,838 A | * | 2/1995 | Orengo | 326/93 |
| 5,517,638 A | * | 5/1996 | Szczepanek | 395/550 |
| 5,604,452 A | * | 2/1997 | Huang | 327/99 |
| 5,652,536 A | * | 7/1997 | Nookala et al. | 327/298 |

\* cited by examiner

Primary Examiner—Kenneth B. Wells
Assistant Examiner—Cassandra Cox
(74) Attorney, Agent, or Firm—Kenyon & Kenyon

(57) ABSTRACT

A system and method are presented for multiplexing two or more clocking signals. In one embodiment, a first enable circuit is provided that receives a select signal, a first clocking signal, and an enable signal from a second enable circuit. The first enable circuit generates an enable signal in response to these signals. For example, the first enable circuit could include a flip-flop clocked by the first clocking signal that generates the enable signal when the first clocking signal has been selected (based on the select signal), when the enable signal from the second enable circuit is deasserted and the first clocking signal has reached a falling edge. The enable signal can then be used to filter the first clocking signal (e.g., using an AND gate) to provide the first clocking signal as an output signal. Using the system and method of the present invention, glitches and spikes seen when multiplexing two or more clocking signals can be avoided.

17 Claims, 2 Drawing Sheets

SYSTEM AND METHOD FOR MULTIPLEXING CLOCKING SIGNALS

BACKGROUND OF THE INVENTION

The present invention relates to the generation of clocking signals. More particularly, the present invention pertains to transitioning from one clock domain to another using a multiplexer.

In digital circuits, a clocking signal is a signal that fluctuates between a high signal value (i.e., a binary "1") and a low signal value (i.e., a binary "0") with a given frequency. The "duty" cycle of the signal reflect how long a signal remains at a logic "1" versus how long a signal remains at a logic "0" during one period. In many systems, the clocking signal has a 50% duty cycle (i.e., the clocking signal spends equal time at logic "0" and logic "1").

At times, a system may require more than one clock signal. In one known system, one clocking signal is selected from two or more clocking signals. For example, if a 2:1 multiplexer is being used, first and second clocking signals are provided as inputs having different frequencies. Based on the "select" input of the multiplexer, one of the clocking signals is provided at the output of the multiplexer. When the select input changes, the output changes to the other of the clocking signals.

One problem seen with this system is that the output signal typically does not provide a smooth transition between the two clocking signals. For example, the switching of the select signal from one level to another may result in an unwanted spike in the output clocking signal. Because the clocking signal is supplied to other components, such a spike could result in errors in these components.

One way to attempt to compensate for this spike is to provide a falling-edge flip-flop to supply the select input to the multiplexer. In such a system, a falling-edge flip-flop is coupled to the select input of the multiplexer described above. The loading input to such a flip-flop would be the select signal and the clocking input would be supplied, for example, by the first clocking signal. Accordingly, after the select input signal changes to select the second clocking signal, it is not supplied to the multiplexer until the first clocking signal hits a falling edge. Because the second clock may be in the middle of an asserted clock pulse, this may also lead to a glitch in the output signal (e.g., an unintended transition from 1 to 0 in the clocking signal).

In view of the above, there is a need for an improved multiplexing circuit that supplies clocking signals without errors during transitions from one clocking signal to another.

DETAILED DESCRIPTION

Figure 1:
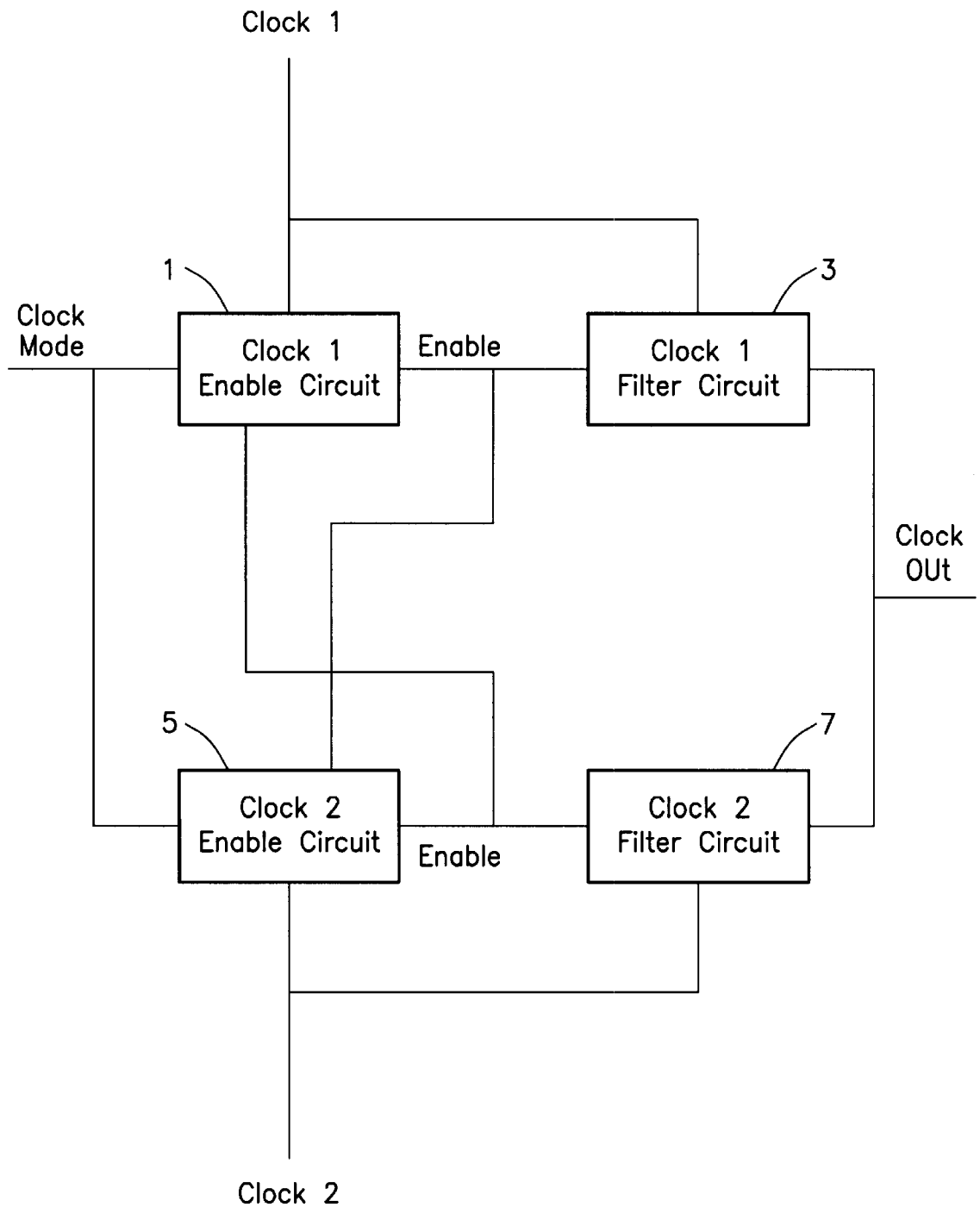
FIG. 1 is a block diagram of a circuit for multiplexing between two clocking signals constructed according to an embodiment of the present invention.

Referring to FIG. 1, a block diagram of a circuit for multiplexing between two clocking signals is shown. In this embodiment, a select signal ("Clock Mode") is provided to select an output clocking signal between a first clocking signal ("Clock 1") and a second clocking signal ("Clock 2"). The Clock Mode signal is provided to a first clock enable circuit 1 and a second clock enable circuit 5. Each of these circuits is capable of generating an enable signal based on at least the Clock Mode signal and the respective clocking signal. In this embodiment, the enable signal is generated for a particular clocking signal when the Clock Mode signal has selected it and the other clocking signal has stopped (i.e., is no longer being output). The indication that the other clocking signal has stopped may be the deassertion of the enable signal for that clocking signal. The enable signals are supplied to respective first and second clock filters 3, 9, and between them, output the appropriate clocking signal as the Clock Out signal.

Figure 2:
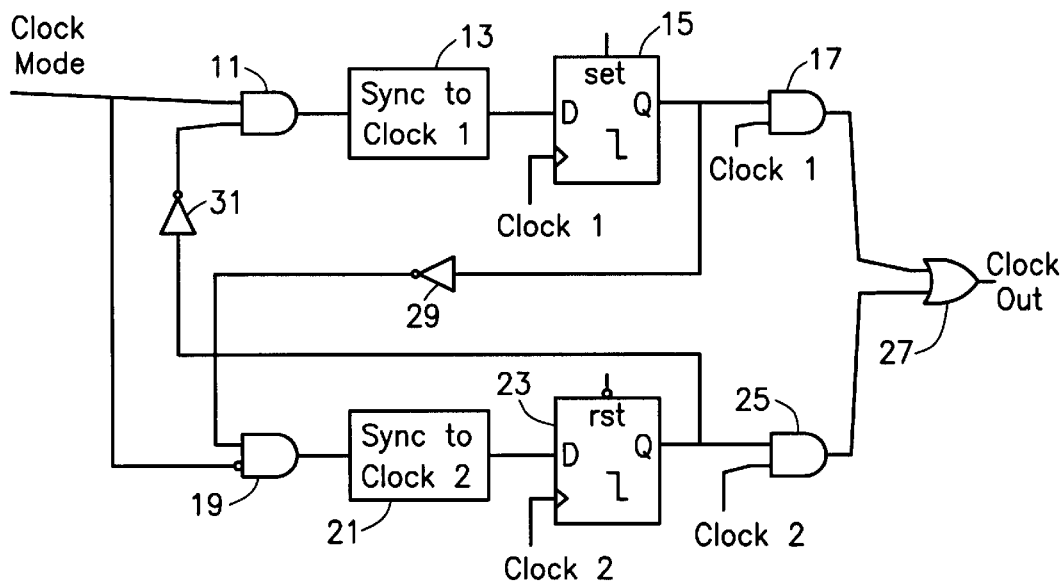
FIG. 2 is a circuit diagram of a circuit for multiplexing between two clocking signals constructed according to an embodiment of the present invention.

Referring to FIG. 2, an example of the block diagram of FIG. 1 is shown. In this embodiment of the present invention, the circuit is initialized by setting the output of a first D-type flip-flop 15 and resetting the output of a second D-type flip-flop 23. The output of the second flip-flop 23 is supplied to an input of a first AND gate 11 via an inverter 31. The output of the first flip-flop 15 is supplied to an input of a second AND gate 19 (via an inverter 29). A signal for selecting the output clocking signal, Clock Mode, is supplied as an input to the first AND gate 11 and as an inverted input to the second AND gate 19. Thus, no more than one output of the first and second AND gates may be asserted at any point in time.

The output of the first AND gate is supplied to the D input of the first flip-flop 15 (to synchronize the output to Clock 1—block 13), while the output of the second AND gate is supplied to the D input of the second flip-flop 23 (to synchronize the output to Clock 2—block 21). The first flip-flop is a falling-edge flip-flop in this embodiment. The first clocking signal, Clock 1, is provided to a clock input for this flip-flop 15. Likewise, the second flip-flop 23 is a falling-edge flip-flop, and the second clocking signal Clock 2, is provided to the clock input for this flip-flop 23. The output of the first flip-flop 15 is provided to an input of a third AND gate 17. The other input to the third AND gate 17 is the Clock 1 signal. The output of the second flip-flop 23 is supplied to a fourth AND gate 25. The other input of the fourth AND gate 25 is the Clock 2 signal. The outputs of the third and fourth AND gates are supplied to an OR gate 27 that provides the Clock Out signal.

Figure 3:
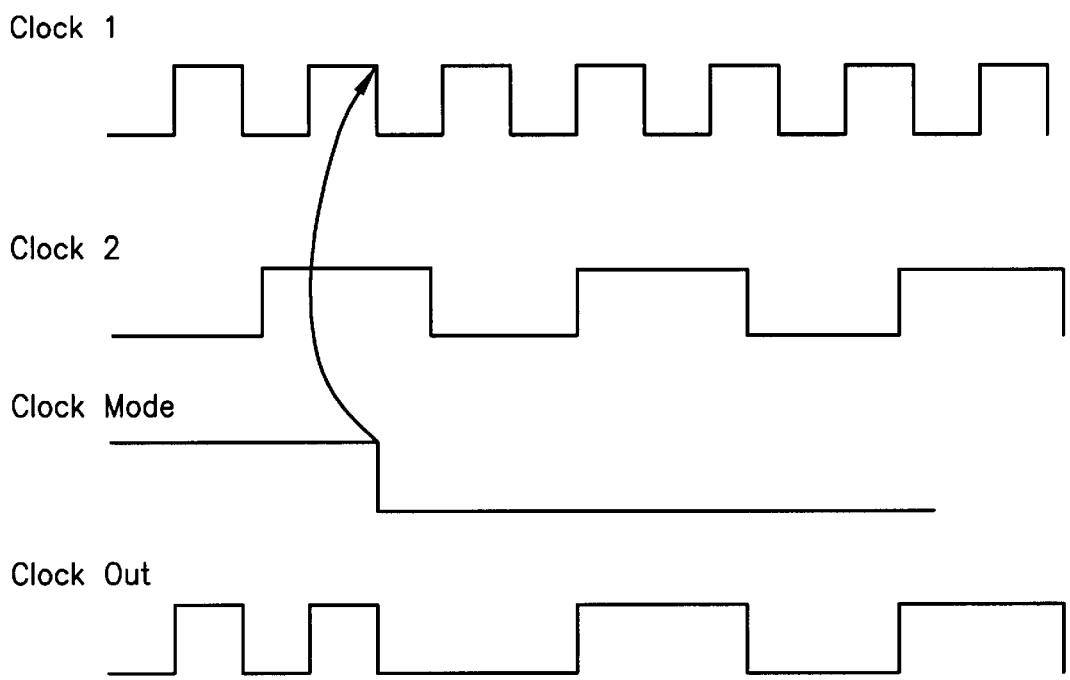
FIG. 3 is a timing diagram showing the interrelationship between various signals in the circuit of FIG. 2.

The operation of the circuit of FIG. 2 will now be described with reference to FIG. 3. It is assumed that the Clock Mode signal is initially set to a "1" value indicating a selection for the Clock 1 signal. After the first and second flip-flops 15, 23 are set/reset, the output of the first flip-flop 15 has a "1" value. This value is then ANDed with the Clock 1 signal and supplied to OR gate 27. On the other hand, the output of the first flip-flop is inverted and provided to the second AND gate 19, insuring that its output will be at a "0" value. Accordingly, the D input of the second flip-flop 23 will also be at a "0" value leaving its output value at the "0" level. The "0" value is supplied to the OR gate 27. Thus, each time the Clock 1 signal transitions to a "1" value, the output of the OR gate 27 will also transition to a "1" value, and every time the Clock 1 signal transitions to a "0" value, the output of the OR gate 27 will also transition to a "0" value. As shown in FIG. 3, while the Clock Mode signal is at a "1" value, the Clock Out signal follows the Clock 1 signal.

When the Clock Mode signal transitions to a "0" value (indicating that the Clock 2 signal should be output instead of the Clock 1 signal), the output of AND gate 11 transitions to a "0" value and is supplied to the D-input of the first flip-flop 15. In this embodiment, when the Clock 1 signal reaches its next transition from a "1" value to a "0" value (i.e., falling edge), the output of this flip-flop also transitions from a "1" value to a "0" value. The output of third AND gate 17 then transitions to a "0" value causing the output of OR gate 27 to remain at "0". As seen in FIG. 3, the Clock Out signal remains at "0" after the last falling edge of the Clock 1 signal (which is after the Clock Mode signal transitions to a new value).

The "0" output of the first flip-flop is inverted to a "1" value and supplied to an input of the second AND gate 19. Since the Clock Mode signal is inverted at the second AND gate 19, both inputs are at a "1" level causing the input to the second flip-flop 23 to be at a "1" level as well. On the next "1" to "0" transition of the Clock 2 signal, the output of the second flip-flop 23 transitions to a "1" level and is supplied to the first AND gate 11 via inverter 31 preventing the output of this AND gate from being at a "1" level. The output of the second flip-flop 23 is supplied as an input to the fourth AND gate 25. Now, when the Clock 2 signal transitions to a "1" value, the output of the AND gate 25 also transitions to a "1" level. As shown in FIG. 3, while the Clock Mode signal remains at a "0" value, the Clock Out signal follows the Clock 2 signal. As seen from the Clock Out signal in FIG. 3, "glitches" in the clocking signal are removed using the circuit described above when switching between two different clocking signals.

Although several embodiments are specifically illustrated and described herein, it will be appreciated that modifications and variations of the present invention are covered by the above teachings and within the purview of the appended claims without departing from the spirit and intended scope of the invention. For example, the present invention can be expanded to multiplex three or more clocking signals.

What is claimed is:

1. A system for selecting and outputting a clocking signal comprising:
    a first enable circuit to receive a select signal, a first clocking signal, and an enable signal from a second enable circuit, said first enable circuit to generate an enable signal based on said select signal, first clocking signal and the enable signal from said second enable circuit and to transmit the enable signal to the second enable circuit, the enable signal from said first enable circuit indicating whether the first clocking signal is being output by said system.

2. The system of claim 1 further comprising:
    a second enable circuit to receive said select signal, a second clocking signal, and the enable signal from said first enable circuit, said second enable circuit to generate the enable signal based on said select signal, said second clocking signal and the enable signal from said first enable circuit the enable signal from said second enable circuit indicating whether the second clocking signal is being output by said system.

3. The system of claim 2 wherein the enable signal from said first enable circuit is generated if the enable signal from said second enable circuit is deasserted and the select signal selects said first clocking signal.

4. The system of claim 3 further comprising:
    a first clock filter coupled to said first enable circuit, said first clock filter to output said first clocking signal in response to the enable signal if asserted from said first enable circuit.

5. The system of claim 4 further comprising:
    a second clock filter coupled to said second enable circuit, said second clock filter to output said second clocking signal in response to the enable signal if asserted from said second enable circuit.

6. A system for selecting a clocking signal comprising:
    a first AND gate to receive a select signal and an enable signal from a second flip-flop;
    a first flip-flop to receive an output from said first AND gate and a first clocking signal, said first flip-flop to generate and enable signal based on said select signal and the enable signal from said second enable flip-flop.

7. The system of claim 6 further comprising:
    a second AND gate to receive said select signal and the enable signal from said first flip-flop;
    a second flip-flop to receive an output from said second AND gate and a second clocking signal, said second flip-flop to generate the enable signal based on said select signal and the enable signal from said first flip-flop.

8. The system of claim 7 wherein the enable signal from said first flip-flop is generated if the enable signal from said second flip-flop is deasserted and the select signal selects said first clocking signal.

9. The system of claim 8 further comprising:
    a third AND gate coupled to said first flip-flop, said third AND gate to receive said first clocking signal and output said first clocking signal in response to the enable signal asserted from said first enable circuit.

10. The system of claim 9 further comprising:
    a fourth AND gate coupled to said second flip-flop, said fourth AND gate to receive said second clocking signal and output said second clocking signal in response to the enable signal asserted from said second flip-flop.

11. A method for selecting and outputting a clocking signal in a multiplexing circuit comprising:
    receiving a select signal at a first enable circuit;
    receiving a first clocking signal at said first enable circuit;
    receiving an enable signal from a second enable circuit;
    generating an enable signal at said first enable circuit based on said select signal, said first clocking signal and the enable signal from said second enable circuit, the enable signal from said first enable circuit indicating whether the first clocking signal is being output by said multiplexing circuit; and
    transmitting the enable signal from said first enable circuit to said second enable circuit.

12. The method of claim 11 further comprising:
    receiving a select signal at a second enable circuit;
    receiving a second clocking signal at said second enable circuit;
    receiving the enable signal from the first enable circuit;
    generating an enable signal at said second enable circuit based on said select signal, said second clocking signal and the enable signal from said first enable circuit, the enable signal from said second enable circuit indicating whether the second clocking signal is being output by said multiplexing circuit.

13. The method of claim 12, wherein the enable signal from said first enable circuit is generated if the enable signal from said second enable circuit is deasserted and the select signal selects said first clocking signal.

14. The method of claim 13 further comprising:
outputting said first clocking signal at a first clock filter coupled to said first enable circuit in response to the enable signal asserted from said first enable circuit.

15. The method of claim 14 further comprising:
outputting said second clocking signal at a second clock filter coupled to said second enable circuit in response to the enable signal asserted from said second enable circuit.

16. The method of claim 11 wherein said first enable circuit includes a first AND gate to receive the select signal and the enable signal from the second enable circuit, and a first flip-flop coupled to an output of said first AND gate and to receive said first clocking signal, and the enable signal is generated after a falling edge of said first clocking signal.

17. The method of claim 12 wherein said second enable circuit includes a second AND gate to receive the select signal and the enable signal from the first enable circuit, and a second flip-flop coupled to an output of said second AND gate and to receive said second clocking signal, and the enable signal is generated after a falling edge of said second clocking signal.

* * * * *